(12) United States Patent
Ittogi et al.

(10) Patent No.: US 10,833,877 B2
(45) Date of Patent: Nov. 10, 2020

(54) METHOD OF AUTHENTICATING AUTHENTICATION-TARGET APPARATUS BY AUTHENTICATION APPARATUS, AUTHENTICATION APPARATUS, AUTHENTICATION- TARGET APPARATUS, AND IMAGE FORMING APPARATUS

(71) Applicant: CANON KABUSHIKI KAISHA, Tokyo (JP)

(72) Inventors: Hirotaka Ittogi, Yokohama (JP); Kenjiro Hori, Tokorozawa (JP); Tsutomu Ishida, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/155,958

(22) Filed: Oct. 10, 2018

(65) Prior Publication Data
US 2019/0116049 A1    Apr. 18, 2019

(30) Foreign Application Priority Data

Oct. 12, 2017   (JP) ................................. 2017-198753
Jul. 26, 2018   (JP) ................................. 2018-140710

(51) Int. Cl.
*H04L 9/14*      (2006.01)
*H04L 9/32*      (2006.01)
(Continued)

(52) U.S. Cl.
CPC ........ *H04L 9/3271* (2013.01); *B41J 2/17546* (2013.01); *H04L 9/0643* (2013.01);
(Continued)

(58) Field of Classification Search
CPC ... H04L 9/3271; H04L 9/0643; H04L 9/0816; H04L 9/14; G06F 3/1222; G06F 3/1238
(Continued)

(56) References Cited

U.S. PATENT DOCUMENTS 9,374,221 B1 *   6/2016 Juels ....................... H04L 9/321
2003/0101378 A1  5/2003 Ohkubo
(Continued)

FOREIGN PATENT DOCUMENTS

JP    2003162986 A    6/2003

OTHER PUBLICATIONS

National Institute of Standards and Technology Federal Information Processing Standards Publication 198-1, released Jul. 2008.
(Continued)

*Primary Examiner* — Jamares Q Washington
(74) *Attorney, Agent, or Firm* — Venable LLP

(57) ABSTRACT

A method of authenticating a target apparatus by an authentication apparatus that holds a first original key out of a plurality of original keys, and an identifier of the first original key, the target apparatus holding a first value and a plurality of derived keys generated by the plurality of original keys and the first value as inputs to a one-way function, the method includes: the target apparatus selecting a selected key from the plurality of derived keys based on the identifier and generating authentication data based on challenge data and a first generated key based on the selected key; and the authentication apparatus generating an authentication key by the first original key and the first value using the one-way function and generating comparison data based on the challenge data and a second generated key based on the authentication key.

27 Claims, 15 Drawing Sheets

(51) Int. Cl.
     *H04L 9/06*      (2006.01)
     *H04L 9/08*      (2006.01)
     *B41J 2/175*     (2006.01)
     *G06F 3/12*      (2006.01)

(52) U.S. Cl.
     CPC .............. *H04L 9/0861* (2013.01); *H04L 9/14* (2013.01); *G06F 3/1222* (2013.01); *G06F 3/1238* (2013.01)

(58) Field of Classification Search
     USPC ........................... 358/1.15, 1.14; 726/21, 27
     See application file for complete search history.

(56) References Cited

U.S. PATENT DOCUMENTS

| | | | | |
|---|---|---|---|---|
| 2007/0143623 | A1* | 6/2007 | Walmsley | H04L 9/3271 713/176 |
| 2011/0109938 | A1* | 5/2011 | Refstrup | B41J 2/17546 358/1.15 |
| 2012/0069991 | A1* | 3/2012 | Junod | G06F 21/445 380/2 |

OTHER PUBLICATIONS

National Institute of Standards and Technology Federal Information Processing Standards Publication 180-4, released Mar. 2012.
National Institute of Standards and Technology Special Publication 800-38B, released May 2005.
National Institute of Standards and Technology Federal Information Processing Standards Publication 197 released Nov. 26, 2001.

\* cited by examiner

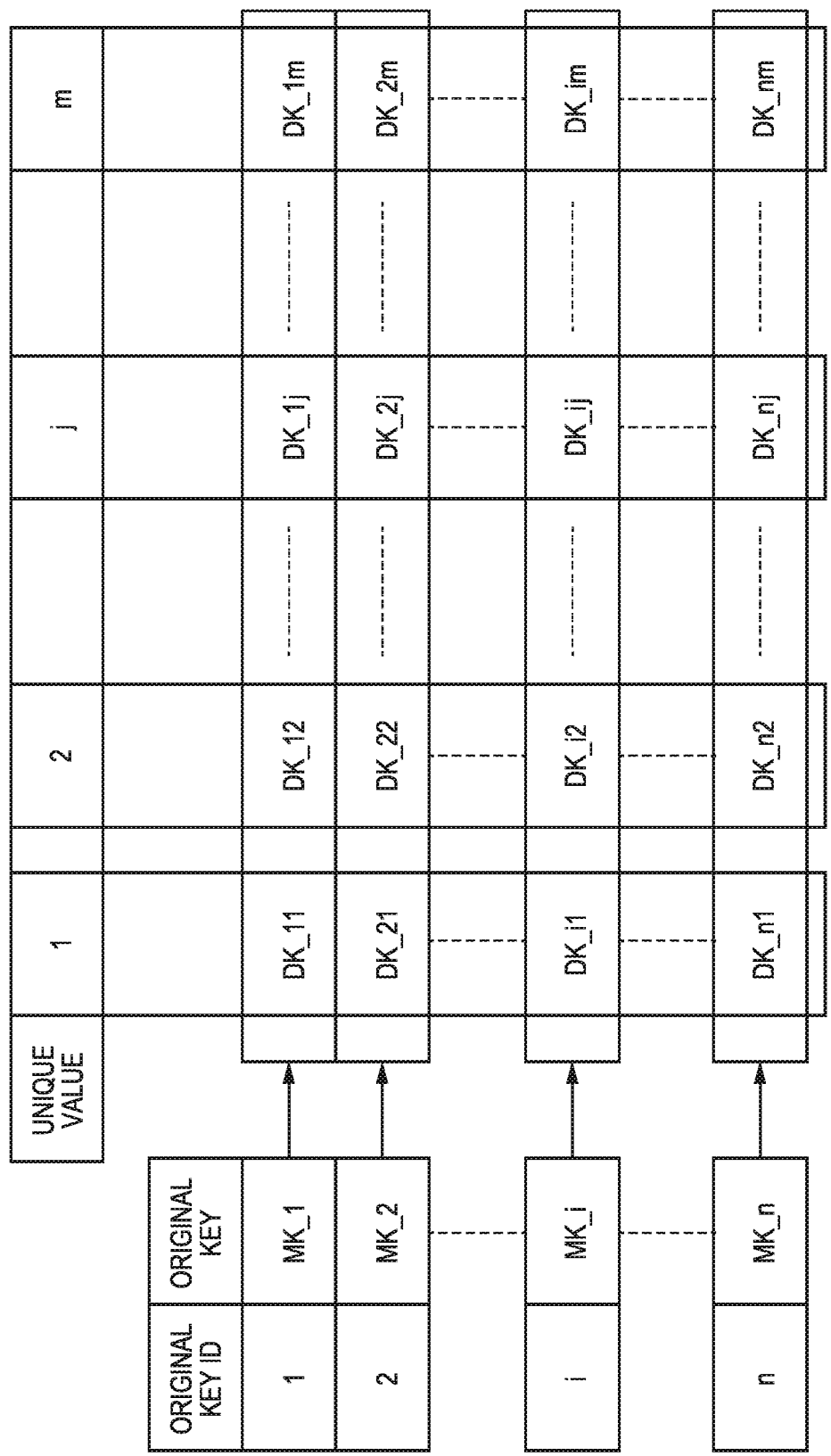

IDENTIFIER: i
ORIGINAL KEY: MK_i

UNIQUE VALUE: j
DERIVED KEY: DK_1j
DERIVED KEY: DK_2j

⋮

DERIVED KEY: DK_nj

UNIQUE VALUE: j
DERIVED KEY: DK_1j
DERIVED KEY: DK_2j

⋮

DERIVED KEY: DK_nj
REGISTER: Rg_1j
REGISTER: Rg_2j

⋮

REGISTER: Rg_nj

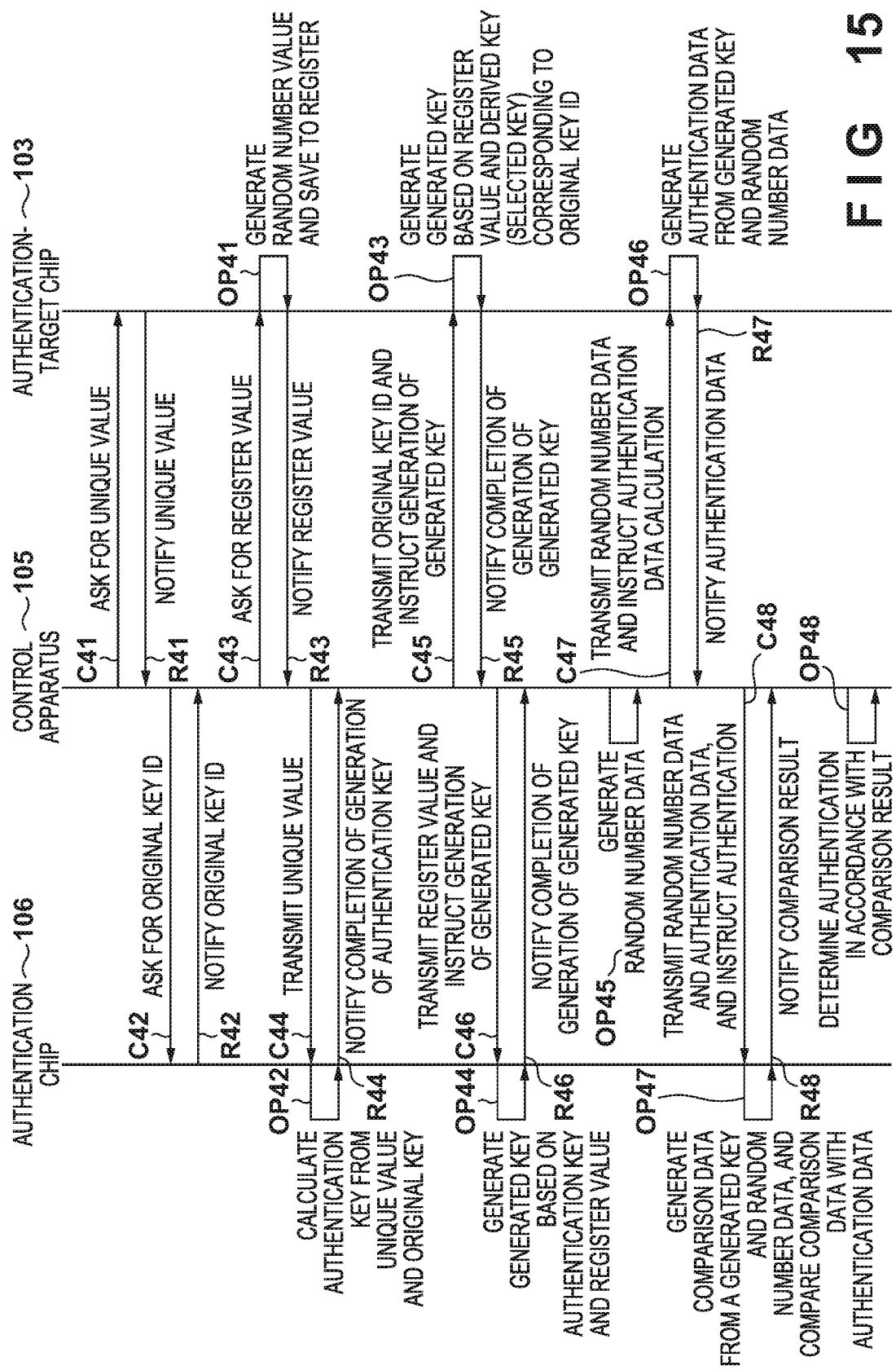

METHOD OF AUTHENTICATING AUTHENTICATION-TARGET APPARATUS BY AUTHENTICATION APPARATUS, AUTHENTICATION APPARATUS, AUTHENTICATION- TARGET APPARATUS, AND IMAGE FORMING APPARATUS

BACKGROUND OF THE INVENTION

Field of the Invention

The present invention relates to a technique for authenticating an authentication-target apparatus by an authentication apparatus, and an image forming apparatus.

Description of the Related Art

An image forming apparatus has a replaceable unit. For example, a fixing unit that causes a toner image formed on a print material to be fixed to the print material is used in a high temperature environment, and thus its lifespan is short in comparison to that of a main body of the image forming apparatus. Accordingly, the fixing unit is normally designed as a replaceable unit. In addition, there are cases where an expansion unit that can be attached to the image forming apparatus is prepared as an option in accordance with a selection by a user. For example, a feeder or a sheet discharge unit may be prepared as an expansion unit. There are cases where imitation goods of these replaceable units or expansion units, which are designed to be able to be detached from the main body of the image forming apparatus, are circulating in the market. When such an imitation good is installed in the image forming apparatus and used, there is the possibility of a problem occurring, such as the image forming apparatus main body malfunctioning. For this reason, there is a need to identify whether a unit attached to the image forming apparatus is a genuine product.

Authentication techniques which are a type of cryptography are already being used to determine/authenticate whether an attached unit is a genuine product. NIST_FIPS_PUB 180-4 discloses the AES algorithm which is shared key encryption. NIST_FIPS_PUB 197 discloses the SHA-256 algorithm, which is a cryptographic hash function. As described by Japanese Patent Laid-Open No. 2003-162986, challenge-response authentication, which uses shared key encryption or a cryptographic hash function, is typically used for authentication. Japanese Patent Laid-Open No. 2003-162986 discloses a configuration in which authentication is performed by an authentication-target apparatus encrypting random number data (the challenge) received from an authentication apparatus and sending back encryption data (the response), and the authentication apparatus determining whether the encryption data is correct. Note that NIST SP 800-38B discloses a method for calculating a message authentication code (a response) based on shared key encryption. Furthermore, NIST_FIPS_PUB 198-1 discloses a method for calculating a message authentication code (a response) based on a cryptographic hash function. Challenge-response authentication assumes that an authentication apparatus and an authentication-target apparatus have the same cryptographic key. Accordingly, it is important to conceal the cryptographic key. Accordingly, storage and authentication processing of the cryptographic key is performed using a tamper-resistant chip having high security, such as a secure LSI.

However, techniques for analyzing secure LSIs are improving year by year, and even if security performance was high when initially developed, there is a possibility that the security performance will decrease in a short period. In Japanese Patent Laid-Open No. 2003-162986, because the authentication apparatus and the authentication-target apparatus hold a shared cryptographic key, it is possible to manufacture an authentication-target apparatus that can be successfully authenticated by the authentication apparatus when analysis of either the authentication apparatus or the authentication-target apparatus succeeds.

SUMMARY OF THE INVENTION

According to an aspect of the present invention, a method of authenticating an authentication-target apparatus by an authentication apparatus that holds a first original key out of a plurality of original keys, and an identifier of the first original key is presented. The authentication-target apparatus holds a first value, and a plurality of derived keys generated by taking each of the plurality of original keys and the first value as inputs to a one-way function. The method includes: the authentication-target apparatus selecting a selected key from the plurality of derived keys based on the identifier of the first original key which was notified from the authentication apparatus; the authentication-target apparatus generating authentication data based on challenge data which was notified from the authentication apparatus, and a first generated key based on the selected key; the authentication apparatus generating an authentication key by taking the first original key and the first value which was notified from the authentication-target apparatus as inputs to the one-way function; the authentication apparatus generating comparison data based on the challenge data and a second generated key based on the authentication key; and the authentication apparatus authenticating the authentication-target apparatus by comparing the comparison data and the authentication data which was notified from the authentication-target apparatus.

Further features of the present invention will become apparent from the following description of exemplary embodiments with reference to the attached drawings.

BRIEF DESCRIPTION OF THE DRAWINGS

FIG. 3 is a view for describing a relationship between original keys, unique values, and derived keys according to an embodiment.

FIG. 10 is a view illustrating information that is stored in the authentication-target chip according to an embodiment.

FIG. 15 is a sequence diagram of an authentication method according to an embodiment.

DESCRIPTION OF THE EMBODIMENTS

Exemplary embodiments of the present invention will be described hereinafter, with reference to the drawings. Note, the following embodiments are examples and the present invention is not limited to the content of the embodiments. Also, for the following drawings, elements that are not necessary in the explanation of the embodiment are omitted from the drawings.

First Embodiment

Figure 1:
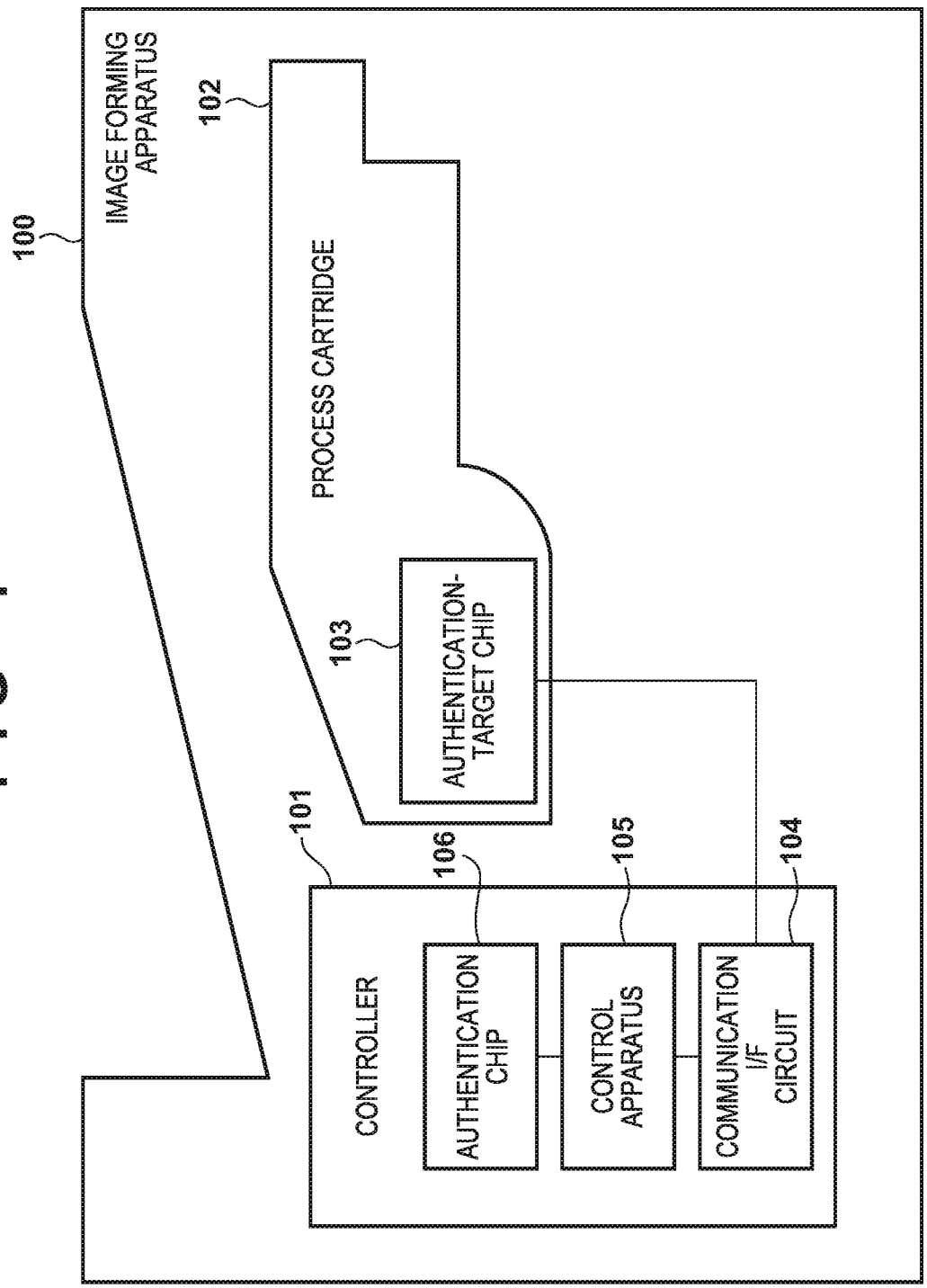
FIG. 1 is a configuration view of an authentication system according to an embodiment.

FIG. 1 is a configuration view of an image forming apparatus 100 to which an authentication system according to the present embodiment is applied. The image forming apparatus 100 has a controller 101 which is an authentication apparatus. In the present embodiment, the controller 101 controls operation of the image forming apparatus 100 as a whole, in addition to authentication processing. A process cartridge 102 is an authentication-target apparatus, and forms an image on a sheet under the control of the controller 101. Note that the process cartridge 102 is a unit that can be detached from the image forming apparatus 100. The controller 101 authenticates the authenticity of the attached process cartridge 102 to determine whether the process cartridge 102 is a genuine product. For this reason, an authentication-target chip 103 for authentication is provided in the process cartridge 102. The authentication-target chip 103 is a tamper-resistant chip. In addition, installed in the controller 101 are a communication I/F circuit 104 for communicating with the authentication-target chip 103, a control apparatus 105 for controlling authentication processing, and an authentication chip 106 for authenticating the process cartridge 102. The authentication chip 106 is a tamper-resistant chip. The image forming apparatus 100 is configured so that, in a state where the process cartridge 102 is installed in the image forming apparatus 100, the communication I/F circuit 104 is electrically connected to the authentication-target chip 103. Accordingly, in a state where the process cartridge 102 is installed in the image forming apparatus 100, the control apparatus 105 can communicate with the authentication-target chip 103 via the communication I/F circuit 104.

Figure 2:
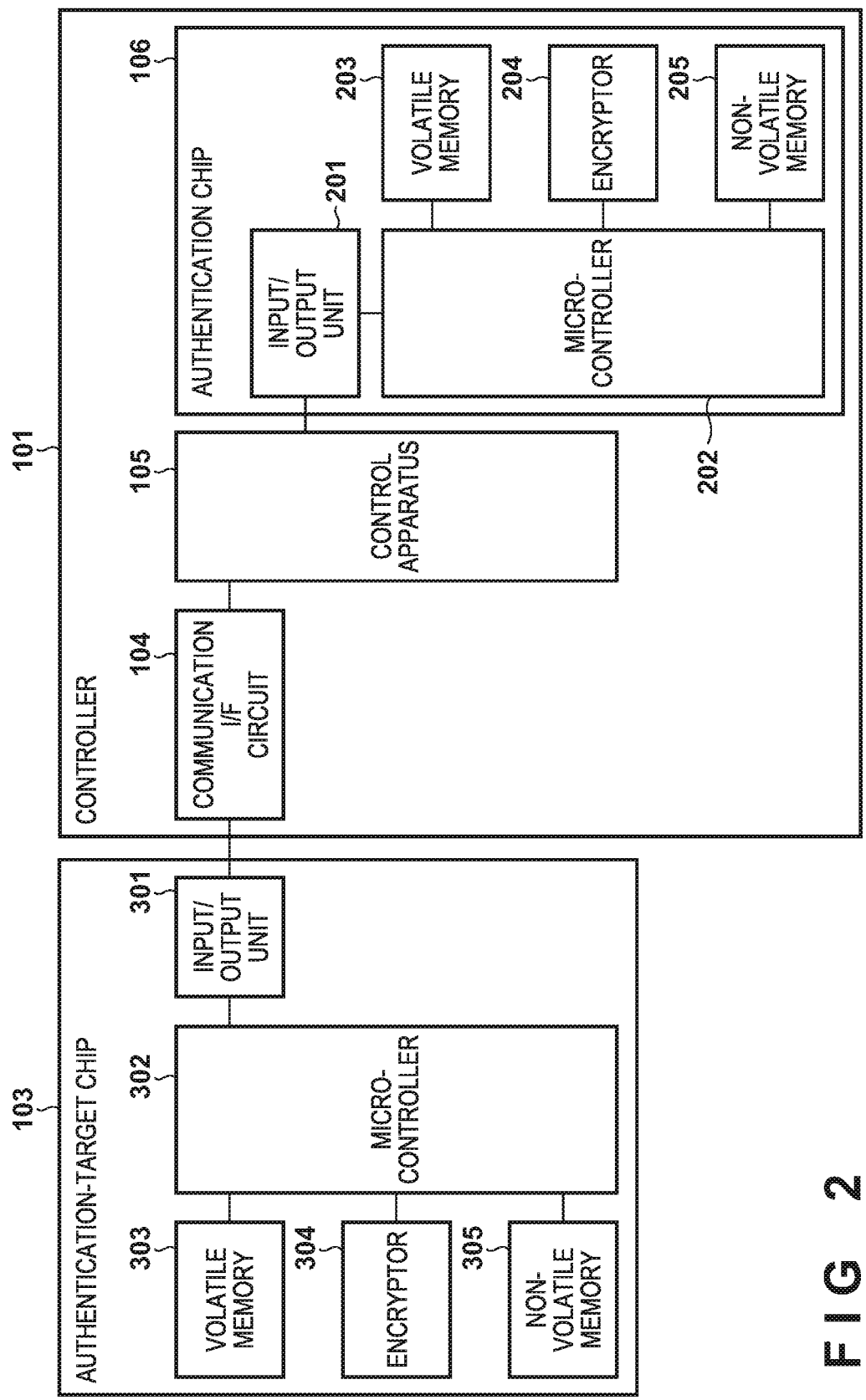
FIG. 2 is a configuration view of an authentication-target chip and a controller according to an embodiment.

FIG. 2 illustrates in more detail internal configurations and a connection configuration for the controller 101 and the authentication-target chip 103. Upon receiving a command from the control apparatus 105, the authentication chip 106 returns a response to the control apparatus 105 as a reply to the command. An input/output unit 201 of the authentication chip 106 transmits and receives responses and commands to and from the control apparatus 105. A microcontroller 202 executes internal processing in accordance with a command from the control apparatus 105. Note that, in such a case, the microcontroller 202 stores temporary data in a volatile memory 203. An encryptor 204 executes an encryption calculation in the authentication processing, in accordance with an instruction from the microcontroller 202. A non-volatile memory 205 holds a key used in the encryption calculation, and data necessary for authentication processing.

In addition, the authentication-target chip 103 receives a command from the control apparatus 105 via the communication I/F circuit 104, and, as a reply, transmits a response to the control apparatus 105 via the communication I/F circuit 104. An input/output unit 301 of the authentication-target chip 103 transmits and receives responses/commands to and from the communication I/F circuit 104. A microcontroller 302 executes internal processing in accordance with a command from the control apparatus 105. Note that, in such a case, the microcontroller 302 stores temporary data in a volatile memory 303. An encryptor 304 executes an encryption calculation in the authentication processing, in accordance with an instruction from the microcontroller 302. Note that the encryptor 204 and the encryptor 304 perform calculations for encryption in accordance with the same algorithm. A non-volatile memory 305 holds a key used in the encryption calculation, and data necessary for authentication processing. A starting point of the authentication processing is the control apparatus 105. In other words, the control apparatus 105 transmits a command to the authentication chip 106 and the authentication-target chip 103, and the authentication chip 106 and the authentication-target chip 103 perform processing in accordance with the command and transmit responses to the control apparatus 105.

Figure 4A:
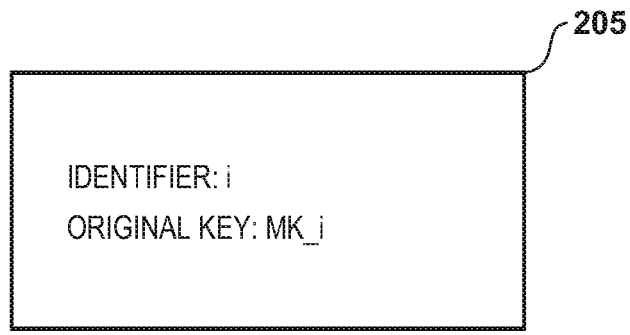
FIG. 4A is a view illustrating information that is stored in the authentication chip according to an embodiment.

FIG. 3 is a view for describing a configuration of keys used in authentication. Firstly, a plurality of original keys (MK) are generated in advance. An identifier (original key ID) is added to a respective original key. FIG. 3 illustrates n original keys, and the identifiers are respectively 1 to n. Below, an original key whose identifier is i is denoted as MK_i. Note that, for the plurality of original keys, respective values thereof are selected so that it is not possible to estimate another original key from one original key. One original key out of this plurality of original keys and the identifier (an original key ID) for this one original key are saved in the non-volatile memory 205 of the authentication chip 106. FIG. 4A illustrates a state in which the value i as the original key ID and the original key MK_i are stored in the non-volatile memory 205. Note that the original key stored in the non-volatile memory 205 in advance is randomly selected from then original keys generated in advance, when the controller 101 is manufactured.

In contrast, a derived key (DK) is stored in the non-volatile memory 305 of the authentication-target chip 103. One derived key is derived in accordance with a one-way function, from one original key and one unique value. Below, a derived key that is derived from a unique value j and an original key MK_i is denoted as a derived key DK_ij. The derived key DK_ij is obtained in accordance with the calculation of DK_ij=F(MK_i, j). Note that F( ) is a one-way function, and can be a function used in a cryptographic hash function, or a shared key encryption calculation. As illustrated by FIG. 3, from n original keys and m unique values, a total of n×m derived keys are generated.

Figure 4B:
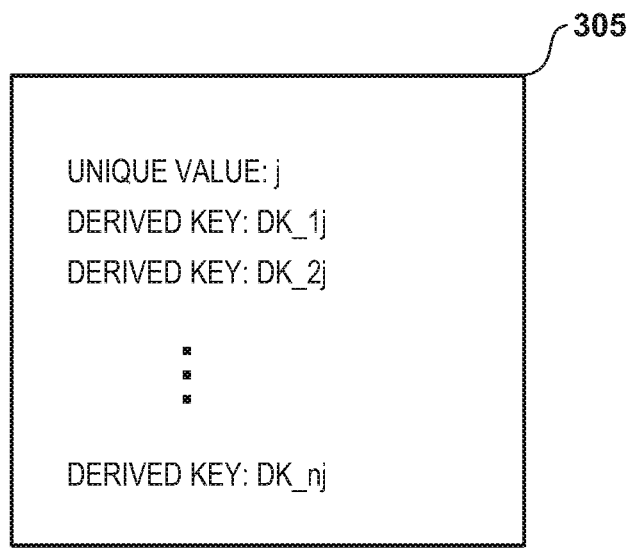
FIG. 4B is a view illustrating information that is stored in the authentication-target chip according to an embodiment.

The non-volatile memory 305 of the authentication-target chip 103 stores one unique value and n derived keys that are respectively generated from the unique value and n original keys. FIG. 4B illustrates a state in which a unique value j and derived keys DK_1j to DK_nj are stored in the non-volatile memory 305.

For the one-way function F( ), it is possible to use a cryptographic hash function or a shared key encryption function, as described above. In the case of a cryptographic hash function, it is possible to use SHA-256 which is disclosed in NIST_FIPS_PUB 180-4. In this case, the derived key DK_ij is obtained by taking data resulting from concatenating an original key MK_i and a unique value j as an input to a cryptographic hash function in accordance with SHA-256. In addition, in the case of a shared key encryption function, it is possible to use AES which is standardized in NIST_FIPS_PUB 197. In this case, the derived key DK_ij can be obtained by taking the unique value j as a message, and encrypting the message with the original key MK_i, by a method in accordance with AES. The unique value stored in the non-volatile memory 305 is decided so as to be different for each process cartridge 102, when the process cartridge 102 is manufactured. Note that, instead of a configuration where differing unique values are stored in all process cartridges 102, there may be a configuration where one unique value selected from a plurality of unique values is assigned to a process cartridge 102. In a manufacturing step, the unique value assigned to the process cartridge 102 and n derived keys respectively generated from the unique value and n original keys are stored in the non-volatile memory 305 of this process cartridge 102.

Figure 5:
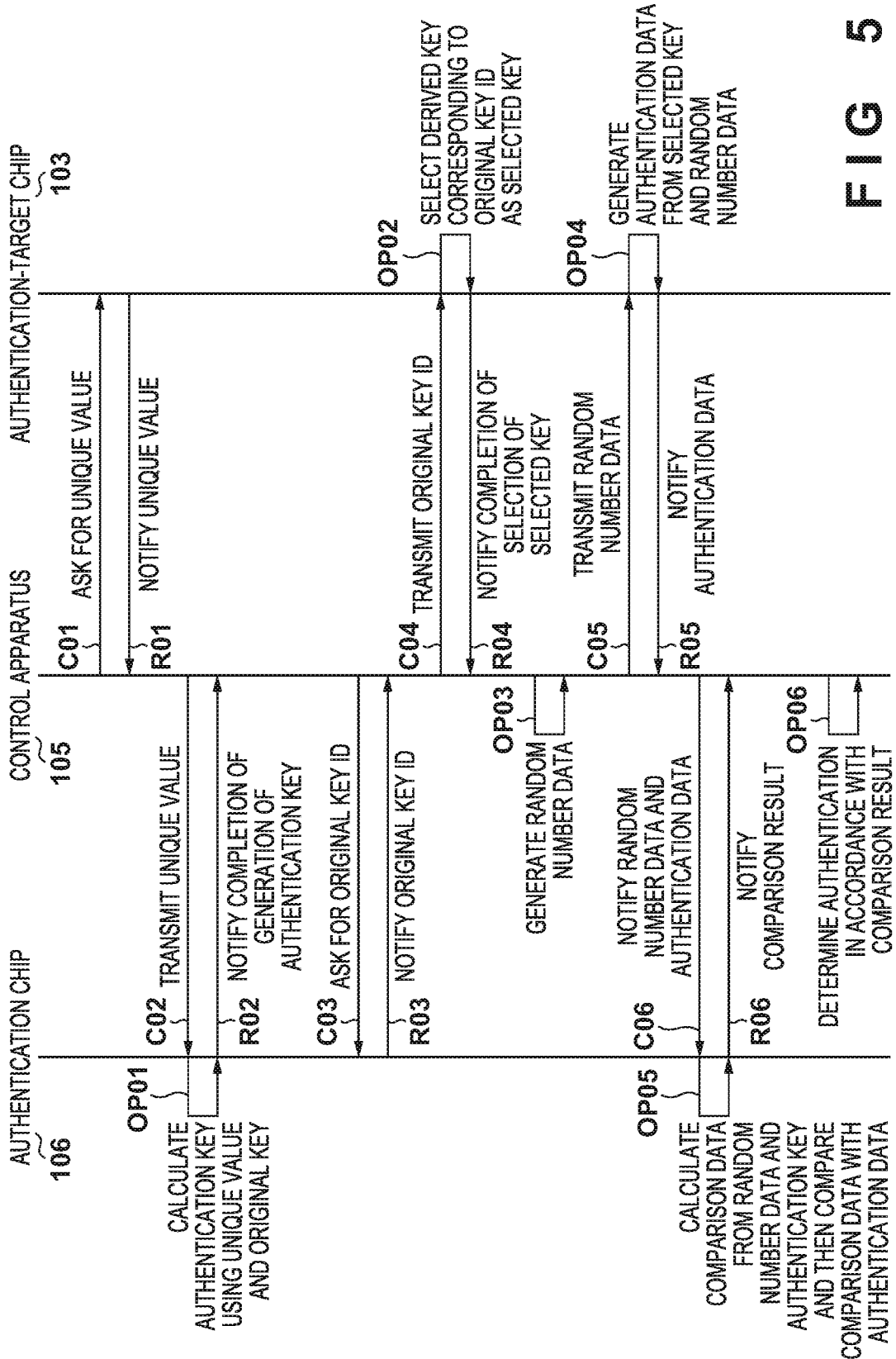
FIG. 5 is a sequence diagram of an authentication method according to an embodiment.

FIG. 5 is a sequence diagram for authentication processing. Note that, in FIG. 5, a signal starting with the letter C indicates a command, and a signal starting with the letter R indicates a response. In addition, the letters OP indicates processing performed by a corresponding apparatus or chip. At C01, the control apparatus 105 asks the authentication-target chip 103 for the unique value. The authentication-target chip 103 reads the unique value j from the non-volatile memory 305, and, at R01, notifies the unique value j to the control apparatus 105. At C02, the control apparatus 105 issues a command to the authentication chip 106 for instructing authentication key generation. This command includes the unique value j. At OP01, in accordance with the command, the authentication chip 106 generates the authentication key DK_ij based on the original key MK_i stored in the non-volatile memory 205 and the received unique value j. Note that a method of generating the authentication key is the same as the method of generating a derived key. When the authentication key DK_ij is generated, the authentication chip 106, at R02, notifies the control apparatus 105 that generation of the authentication key is complete. At C03, the control apparatus 105 asks the authentication chip 106 for an original key ID. The authentication chip 106 reads out the original key ID stored in the non-volatile memory 205, and, at R03, notifies the original key ID to the control apparatus 105. Note that, in the present example, the original key ID stored in the non-volatile memory 205 is i.

At C04, the control apparatus 105 transmits the original key ID to the authentication-target chip 103. At OP02, the authentication-target chip 103 selects the derived key corresponding to the original key ID as a selected key. Accordingly, when the authentication-target chip 103 is legitimate, the selected key selected by the authentication-target chip 103 is the same as the authentication key DK_ij generated by the authentication chip 106 at OP01. When the selected key is selected, the authentication-target chip 103, at R04, notifies the control apparatus 105 that selection of the selected key is complete. At OP03, the control apparatus 105 generates random number data as challenge data. At C05, the control apparatus 105 transmits a command to generate authentication data to the authentication-target chip 103. This command includes the random number data (challenge data).

At OP04, the authentication-target chip 103 uses the encryptor 304 to generate authentication data, which is response data, from the selected key DK_ij and the random number data. At R05, the authentication-target chip 103 notifies the authentication data (response data) to the control apparatus 105. At C06, the control apparatus 105 issues a command to the authentication chip 106 to generate comparison data. This command includes the random number data and the authentication data. At OP05, the authentication chip 106 uses the encryptor 204 to generate the comparison data from the authentication key DK_ij and the random number data, and compares the comparison data with the authentication data. Because the encryptor 204 and the encryptor 304 perform the same encryption calculation, authentication data and the comparison data match when the authentication-target chip 103 is legitimate. At R06, the authentication chip 106 notifies a comparison result to the control apparatus 105, in other words, whether the comparison data and the authentication data match. At OP06, the control apparatus 105 determines authentication OK upon receiving a notification that the comparison data and the authentication data match, and determines authentication NG (no good) when there is no match.

The control apparatus 105 determines that the process cartridge 102 is a genuine article upon determining authentication OK, and determines that the process cartridge 102 is not a genuine article upon determining authentication NG. Upon determining that the process cartridge 102 is not a genuine article, the control apparatus 105 displays to a user that the process cartridge 102 is not a genuine article, for example. Alternatively, upon determining that the process cartridge 102 is not a genuine article, for example, the control apparatus 105 suspends image forming processing, and performs a display, on a display unit (not shown) of the image forming apparatus, for entrusting a user with a decision of whether to permit image formation.

Note that the order of the sequence of FIG. 5 is an example, and the present invention is not limited to order of the sequence illustrated in FIG. 5. For example, it is possible to have a configuration in which the authentication-target chip 103 is caused to first select a selected key, and subsequently the authentication chip 106 is caused to calculate an authentication key. In addition, it is possible to notify an original key ID and random number data to the authentication-target chip 103 at the same time, and cause the authentication-target chip to generate authentication data. Furthermore, it is possible to notify a unique value, random number data, and authentication data to the authentication chip 106 at the same time, and instruct the authentication chip 106 to calculate an authentication key, calculate comparison data, and compare the authentication data with the comparison data. In other words, it is sufficient if data necessary for a calculation is notified to the authentication chip 106 or the authentication-target chip 103 before it performs the calculation. In addition, in the sequence of FIG. 5, although the comparison data and the authentication data are compared in the authentication chip 106, it is possible to have a configuration in which the comparison of the comparison data and the authentication data is performed by the control apparatus 105. In such a case, there is no necessity to notify authentication data to the authentication chip 106 at C06, and at R06 the comparison data is notified to the control apparatus 105 instead of a comparison result being notified.

For calculation of the authentication data, it is possible to use CMAC, which is based on a shared key encryption technology and described in NIST SP 800-38B, for example. In such a case, the random number data is taken as a message, encryption of the message is performed with the selected key DK_ij, and the encrypted data for the message is taken as the authentication data. For calculation of the authentication data, it is possible to use HMAC, which is based on a cryptographic hash function and described in NIST_FIPS_PUB 198-1, for example. In such a case, the random number data is taken as a text, and an encrypted hash value of a message is obtained with the selected key DK_ij. It is similar for the calculation of the comparison data. Of course, the same algorithm is used for the calculation of the authentication data and the comparison data.

For example, assume that the authentication chip 106 is attacked, and the original key MK_i held by the authentication chip 106 leaks. In such a case, the attacker could generate the derived key that is generated by using the obtained original key MK_i, but they could not generate the derived keys that correspond to other original keys. In such a case, the attacker could manufacture a unit that could authenticate as legitimate with an image forming apparatus 100 storing the original key MK_i in the authentication chip 106, but this unit would not have success in authenticating with an image forming apparatus 100 storing other original keys in the authentication chip 106.

For example, assume that the authentication-target chip 103 is attacked, and a derived key held by the authentication-target chip 103 leaks. Here, as illustrated by the sequence of FIG. 5, the selected key is selected in accordance with the original key ID held by the authentication chip 106, from the plurality of derived keys held by the authentication-target chip 103. Accordingly, as long as all of the derived keys do not leak from the authentication-target chip 103, it is not possible to manufacture a unit that can successfully authenticate with all image forming apparatuses 100. Here, because in a destruction attack, which is a dramatic analysis technique with respect to a tamper-resistant chip, the chip is cut and shaved off, and it is very difficult to obtain the plurality of keys stored in an authentication-target chip before the chip is destroyed.

By the above configuration, it is possible to suppress the impact from the leakage of original keys or derived keys due to an attack. In this way, by virtue of the present embodiment, it is possible to have the difficulty of analysis with respect to the authentication chip 106 and the authentication-target chip 103 be higher than in the past. In particular, it is possible to provide an authentication system for making analysis of the authentication chip 106 essentially meaningless.

Second Embodiment

Figure 6:
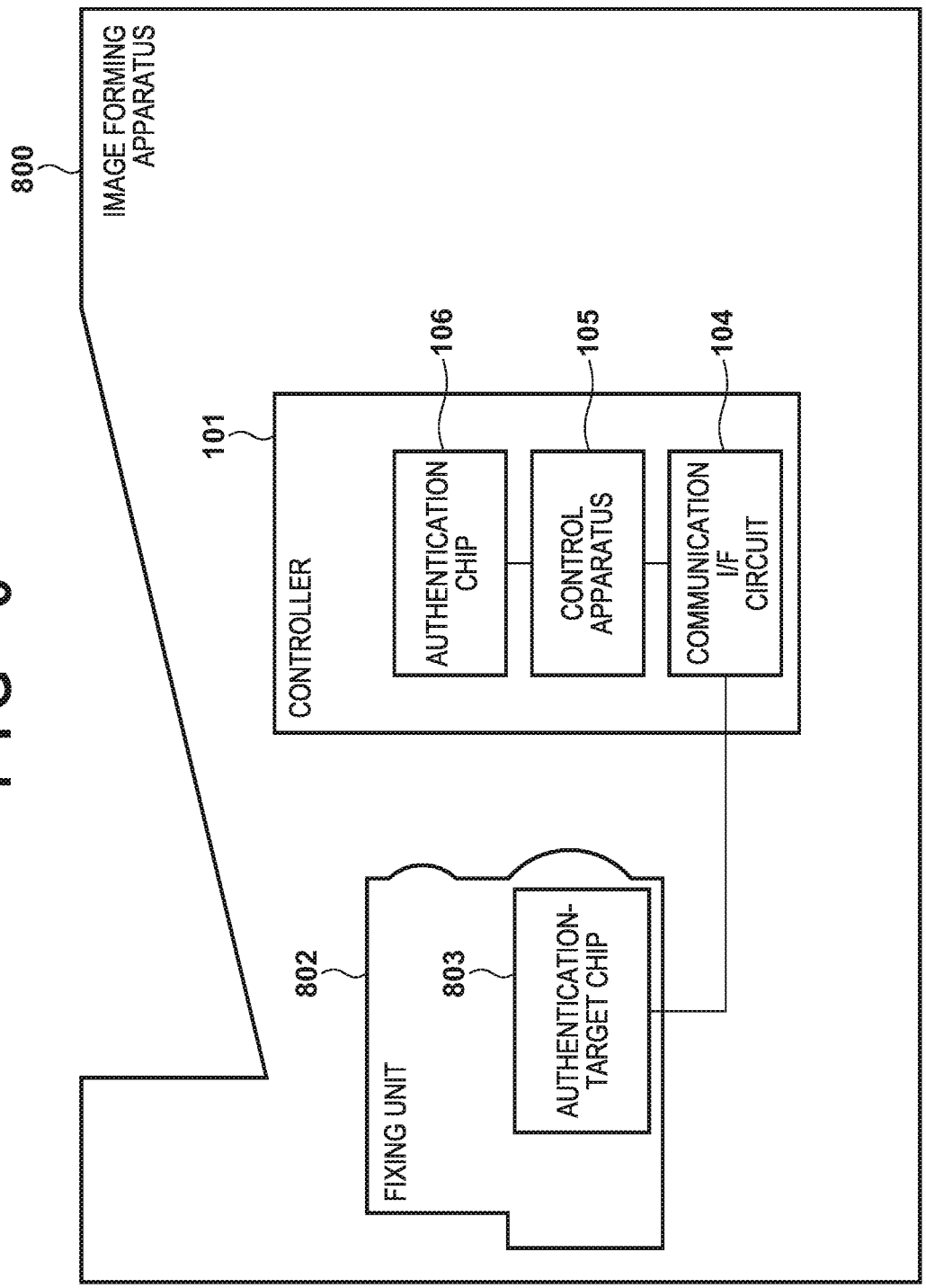
FIG. 6 is a configuration view of an authentication system according to an embodiment.
Figure 7:
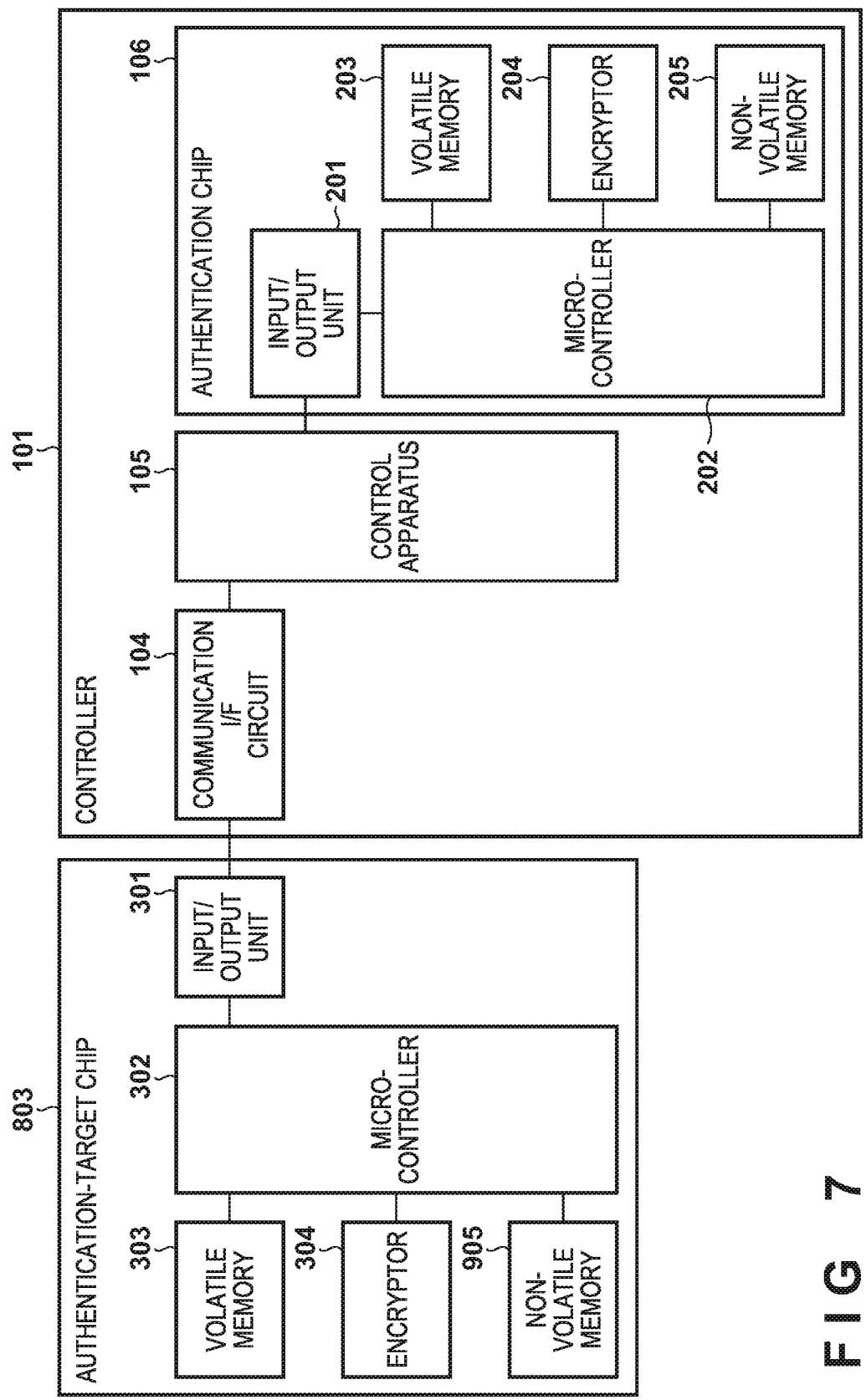
FIG. 7 is a configuration view of an authentication-target chip and a controller according to an embodiment.
Figure 8:
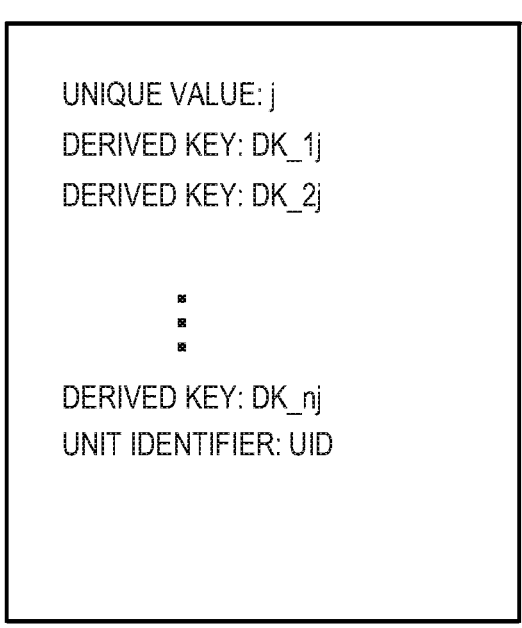
FIG. 8 is a view illustrating information that is stored in the authentication-target chip according to an embodiment.

Subsequently, description is given regarding the second embodiment focusing on points of difference with the first embodiment. Note that the same reference numerals are used for elements that are the same as those described in the first embodiment, and description thereof is omitted. FIG. 6 illustrates an example of applying an authentication system according to the present embodiment to an image forming apparatus 800. Unlike in the first embodiment, the controller 101 performs authentication of a fixing unit 802 which is a unit that can be detached from the image forming apparatus 800. The fixing unit 802 has an authentication-target chip 803 which is a tamper-resistant chip. FIG. 7 illustrates in more detail internal configurations and a connection configuration for the controller 101 and the authentication-target chip 803. The configuration of the controller 101 of the present embodiment is similar to that in the first embodiment, and the non-volatile memory 205 stores the information illustrated in FIG. 4A. In contrast, as illustrated by FIG. 8, a non-volatile memory 905 of the authentication-target chip 803 stores the unique value j, the derived keys DK_1j to DK_nj, and a unit identifier UID. The unit identifier UID is assigned to a unit that can be installed in the image forming apparatus 800, and is data for identifying the unit. Note that a method of generating the derived keys DK_1j to DK_nj is the same as that in the first embodiment.

Figure 9:
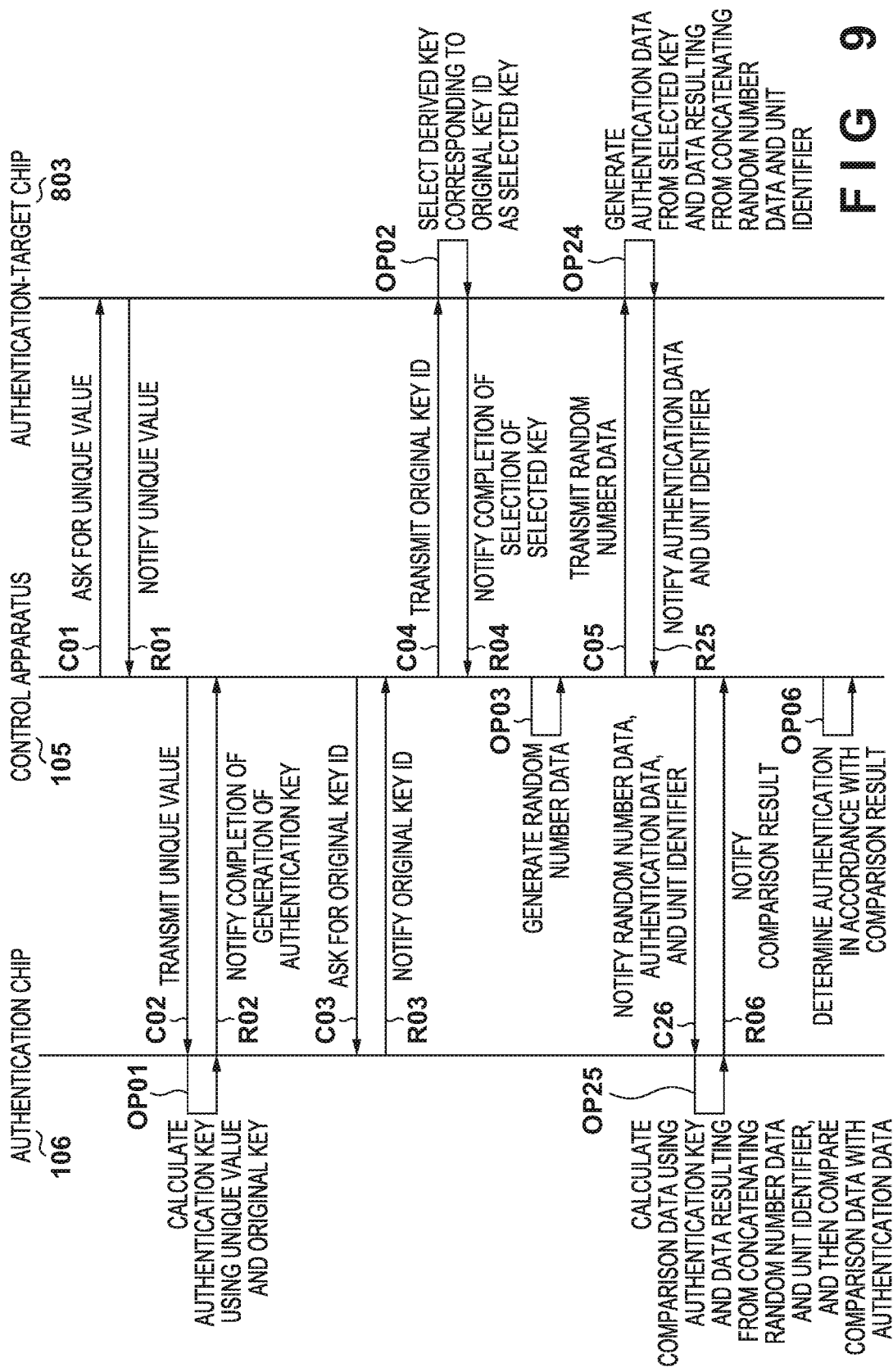
FIG. 9 is a sequence diagram of an authentication method according to an embodiment.

FIG. 9 is a sequence diagram of authentication processing according to the present embodiment. Processing up until C05 is the same as that in the first embodiment, and description thereof is omitted. Upon receiving the random number data, the authentication-target chip 803, at OP24, uses the encryptor 304 to generate authentication data. In the present embodiment, the encryptor 304 generates the authentication data in accordance with the selected key DK_ij, and concatenated data resulting from concatenating the random number data and the unit identifier stored in the non-volatile memory 905. At R25, the authentication-target chip 803 notifies the authentication data and the unit identifier to the control apparatus 105. At C26, the control apparatus 105 issues a command to the authentication chip 106 to generate comparison data. The command includes the random number data, the authentication data, and the unit identifier. At OP25, the authentication chip 106 uses the encryptor 204 to generate the comparison data, in accordance with the authentication key DK_ij, and concatenated data resulting from concatenating the random number data and the unit identifier. Because the encryptor 204 and the encryptor 304 perform the same encryption calculation, authentication data and the comparison data match when the authentication-target chip 803 is legitimate. At R06, the authentication chip 106 notifies a comparison result to the control apparatus 105, in other words, whether the comparison data and the authentication data match. At OP06, the control apparatus 105 determines authentication OK upon receiving a notification that the comparison data and the authentication data match, and determines authentication NG when there is no match.

For calculation of the authentication data, it is possible to use CMAC, which is based on a shared key encryption technology and described in NIST SP 800-38B, for example. In such a case, the concatenated data resulting from concatenating the random number data and the unit identifier is taken as a message, and encryption of the message is performed with the selected key DK_ij. For calculation of the authentication data, it is possible to use HMAC, which is based on a cryptographic hash function and described in NIST_FIPS_PUB 198-1 for example. In such a case, the concatenated data resulting from concatenating the random number data and the unit identifier is taken as a text, and an encrypted hash value of the text is obtained with the selected key DK_ij. It is similar for the calculation of the comparison data. Of course, the same algorithm is used for the calculation of the authentication data and the comparison data.

In the present embodiment, the unit identifier is used in generation of the authentication data and the comparison data. Accordingly, in addition to a similar effect as in the first embodiment, it is possible to verify whether the unit identifier is a value used in a genuine product. In other words, although illustration is not made in FIG. 9, it is possible to make a determination of authentication NG when the unit identifier is not used by the fixing unit 802, even if the authentication data and the comparison data match, for example.

Third Embodiment

Subsequently, description is given regarding the third embodiment focusing on points of difference with the first embodiment. An authentication system according to the present embodiment has the same configuration as in FIG. 1 and FIG. 2, and the information illustrated in FIG. 4A is stored in the non-volatile memory 205 of the authentication chip 106. In addition, as illustrated by FIG. 10, the non-volatile memory 305 of the authentication-target chip 103 stores the unique value j and the derived keys $DK\_1j$ to $DK\_nj$, similarly to in the first embodiment. Furthermore, in the present embodiment, registers $Rg\_1j$ to $Rg\_nj$ are provided in the non-volatile memory 305 of the authentication-target chip 103. A register $Rg\_ij$ (i is an integer from 1 to n) corresponds to the derived key $DK\_ij$, and an original key ID whose value is i. As described below, a register value corresponding to the derived key $DK\_ij$ is stored in the register $Rg\_ij$, and the register value of the derived key $DK\_ij$ is updated each time the derived key $DK\_ij$ is used in authentication processing. In the present embodiment it is assumed that, when the derived key $DK\_ij$ is used in authentication processing, the register value of the register $Rg\_ij$ is caused to increase by 1. Note that an initial value of the register $Rg\_ij$ is randomly determined, for example.

Figure 11:
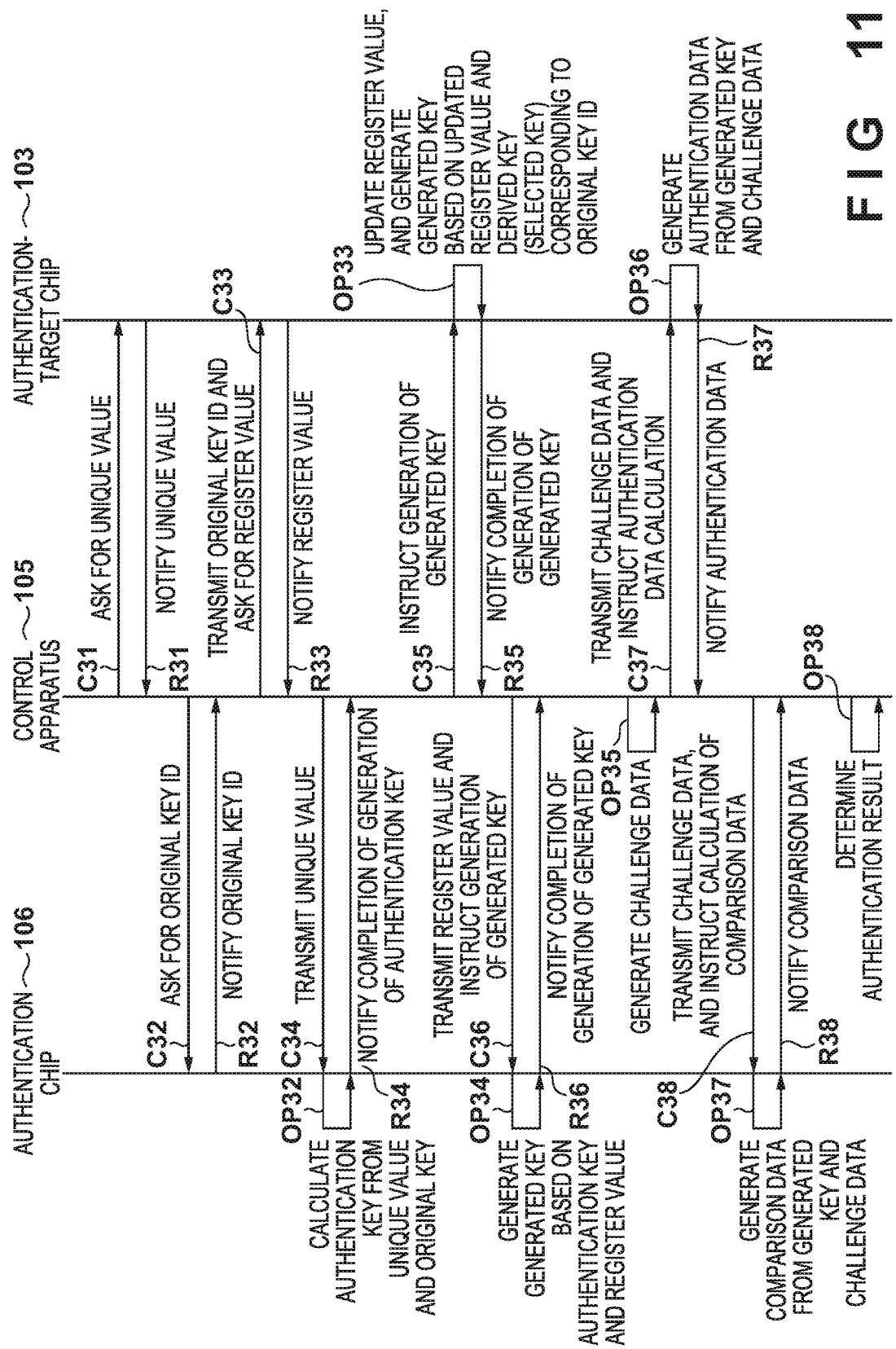
FIG. 11 is a sequence diagram of an authentication method according to an embodiment.

FIG. 11 is a sequence diagram of authentication processing according to the present embodiment. At C31, the control apparatus 105 asks the authentication-target chip 103 for the unique value. The authentication-target chip 103 reads the unique value j from the non-volatile memory 305, and, at R31, notifies the unique value j to the control apparatus 105. At C32, the control apparatus 105 asks the authentication chip 106 for an original key ID. The authentication chip 106 reads out the original key ID stored in the non-volatile memory 205, and, at R32, notifies the original key ID to the control apparatus 105. Note that, in the present example, the original key ID stored in the non-volatile memory 205 is i. At C33, the control apparatus 105 transmits the original key ID to the authentication-target chip 103, and asks the authentication-target chip 103 for the register value corresponding to the transmitted original key ID. In the present embodiment, because the original key ID is i, this corresponds to asking for the register value stored in the register $Rg\_ij$. Note that instead of directly transmitting the original key ID, it is possible to have a configuration in which the original key ID is notified to the authentication-target chip 103 by notifying the address of the register $Rg\_ij$ of the non-volatile memory 305 to the authentication-target chip 103. Note that, in such a case, a relationship between the original key ID and the address in the non-volatile memory 305 of the register $Rg\_ij$ that corresponds to the original key ID is stored in the control apparatus 105 in advance. The authentication-target chip 103 reads out the register value of the register $Rg\_ij$ from the non-volatile memory 305, and, at R33, notifies the register value of the register $Rg\_ij$ to the control apparatus 105.

At C34, the control apparatus 105 issues a command to the authentication chip 106 for instructing authentication key generation. This command includes the unique value j. At OP32, in accordance with the command, the authentication chip 106 generates the authentication key $DK\_ij$ based on the original key $MK\_i$ stored in the non-volatile memory 205 and the received unique value j. Note that a method of generating the authentication key is the same as the method of generating a derived key. When the authentication key $DK\_ij$ is generated, the authentication chip 106, at R34, notifies the control apparatus 105 that generation of the authentication key is complete.

At C35, the control apparatus 105 issues a command to the authentication-target chip 103 for instructing generated key generation. At OP33, firstly the authentication-target chip 103 selects the derived key corresponding to the original key ID as a selected key. Note that the original key ID is notified at C33. When the authentication-target chip 103 is legitimate, the selected key selected by the authentication-target chip 103 is the same as the authentication key $DK\_ij$ generated by the authentication chip 106 at OP32. Subsequently, the authentication-target chip 103 performs an update to increase by 1 the register value stored in the register $Rg\_ij$ corresponding to the selected key. A generated key is generated by taking the updated register value and the selected key as inputs for a one-way function. When the generated key is generated, the authentication-target chip 103, at R35, notifies the control apparatus 105 that generation of the generated key is complete.

At C36, the control apparatus 105 issues a command to the authentication chip 106 for instructing generated key generation. This command includes the register value. Note that it is possible to have a configuration in which the register value is notified to the authentication chip 106 in advance at the timing of C34, and in this case only the instruction of the command is made at C36. At OP34, the authentication chip 106 generates a generated key based on the authentication key $DK\_ij$ generated at OP32, and a value resulting from causing the notified register value to increase by 1. Note that an algorithm for generating the generated key is the same as the algorithm for generating the generated key in the authentication-target chip 103 at OP33. When the generated key is generated, at R36 the authentication chip 106 notified the control apparatus 105 of the completion of the generation of the generated key.

At OP35, the control apparatus 105 generates a predetermined fixed value as challenge data. At C37, the control apparatus 105 transmits to the authentication-target chip 103 a command for generating authentication data. This command includes the fixed value (challenge data). At OP36, the authentication-target chip 103 uses the encryptor 304 to generate the authentication data which is response data, from the generated key and the fixed value. At R37, the authentication-target chip 103 notifies the authentication data (response data) to the control apparatus 105.

Similarly, at C38, the control apparatus 105 transmits to the authentication chip 106 a command for generating comparison data. This command includes the fixed value (challenge data) generated at OP35. At OP37, the authentication chip 106 uses the encryptor 204 to generate the comparison data from the generated key and the fixed value. At R38, the authentication chip 106 notifies the comparison data (response data) to the control apparatus 105.

At OP38, the control apparatus 105 compares authentication data received from the authentication-target chip 103, and the comparison data received from the authentication chip 106. Because the encryptor 204 and the encryptor 304 perform the same encryption calculation, authentication data and the comparison data match when the authentication-target chip 103 is legitimate. The control apparatus 105 determines authentication OK if they match, and determines authentication NG if they do not match.

The control apparatus 105 determines that the process cartridge 102 is a genuine article upon determining authentication OK, and determines that the process cartridge 102 is not a genuine article upon determining authentication NG. Upon determining that the process cartridge 102 is not a genuine article, for example, the control apparatus 105 suspends image forming processing, and performs a display, on a display unit (not shown) of the image forming apparatus, for entrusting a user with a decision of whether to permit image formation.

Note that the order of the sequence of FIG. 11 is an example, and the present invention is not limited to the order of the sequence illustrated in FIG. 11. Specifically, the order of the sequence is arbitrary as long as the data necessary for the calculations by the authentication chip 106 and the authentication-target chip 103 is notified by the control apparatus 105 to the authentication chip 106 and the authentication-target chip 103 before the calculations are performed. In addition, in the present embodiment, a calculation for causing the register value to increase by 1 is performed, and the generated key is generated based on the register value after the calculation. However, as long as the authentication chip 106 and the authentication-target chip 103 perform the same predetermined calculation, the method for calculating (method of updating) the register value is not limited to increasing the register value by 1, and any calculation method can be used. In addition, methods of calculating the authentication data and the comparison data are the same except that a selected key and an authentication key were generated keys in the first embodiment. In other words, although generated keys are generated from a selected key and an authentication key in the present embodiment, the first embodiment and the second embodiment use the selected key and the authentication key as generated keys.

One method for cracking a key for encryption is a method in which inputs and outputs to and from an encryptor are observed while the encryptor is caused to repeatedly operate. For example, with the same combination of the image forming apparatus 100 and the process cartridge 102, because the authentication key and the selected key used in authentication are always the same, there is the possibility that the authentication key or the selected key will leak due to this method. However, in the present embodiment, in place of the authentication key and the selected key of the first embodiment, generated keys that are derived from the authentication key and the selected key are used to generate authentication data and comparison data. Because register values that change in value each time of authentication are used for generation of the generated keys, the generated keys change every time for authentication. Accordingly, with the configuration of the present embodiment, it is very difficult to derive the authentication key or the selected key even with a method that observes inputs and outputs with respect to an encryptor while causing the encryptor to repeatedly operate. In addition, in the present embodiment, the generated keys are generated based on values resulting from performing a predetermined operation on register values, and not based on register values that are transmitted and received between the control apparatus 105 and the authentication chip 106 or the authentication-target chip 103. Accordingly, as long as the details of the predetermined calculation do not leak, an updated register value used in generation of a generated key is unclear even if it is possible to obtain register values that are transmitted and received, and it is possible to reduce the danger of the authentication key or the selected key leaking.

Note that, in the present embodiment, because a generated key used in generation of authentication data or comparison data changes each time for authentication, although the challenge data was given as fixed predetermined data, it is possible to have the challenge data be random data, similarly to in the first embodiment. Note that, in the present embodiment, comparison of authentication data and the comparison data is performed in the control apparatus 105, but configuration may be taken such that the comparison is performed by the authentication chip 106, similarly to in the first embodiment.

Fourth Embodiment

Figure 12:
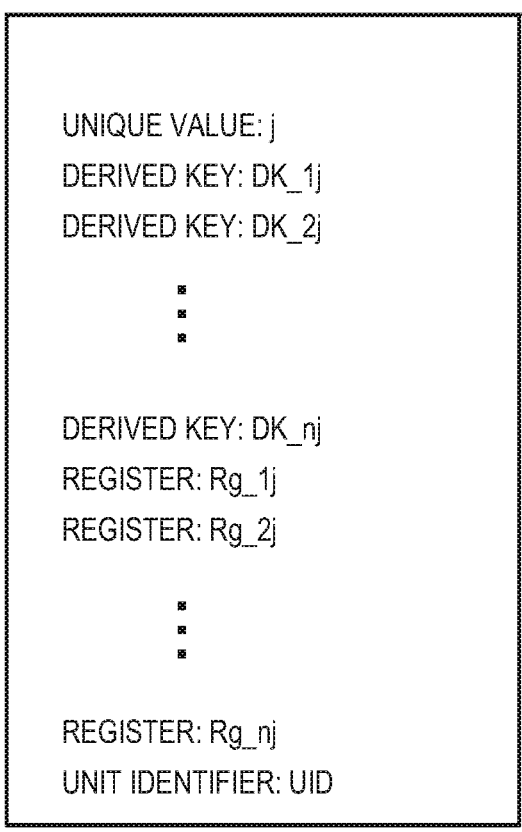
FIG. 12 is a view illustrating information that is stored in the authentication-target chip according to an embodiment.

Subsequently, description is given regarding the fourth embodiment focusing on points of difference with the third embodiment. An authentication system according to the present embodiment has the same configuration as in FIG. 1 and FIG. 2, and the information illustrated in FIG. 4A is stored in the non-volatile memory 205 of the authentication chip 106. However, as illustrated by FIG. 12, the non-volatile memory 305 of the authentication-target chip 103 stores a unit identifier UID in addition to the same information as in the third embodiment. The unit identifier UID is assigned to a unit that can be installed in the image forming apparatus 100, and is data for identifying the unit.

Figure 13:
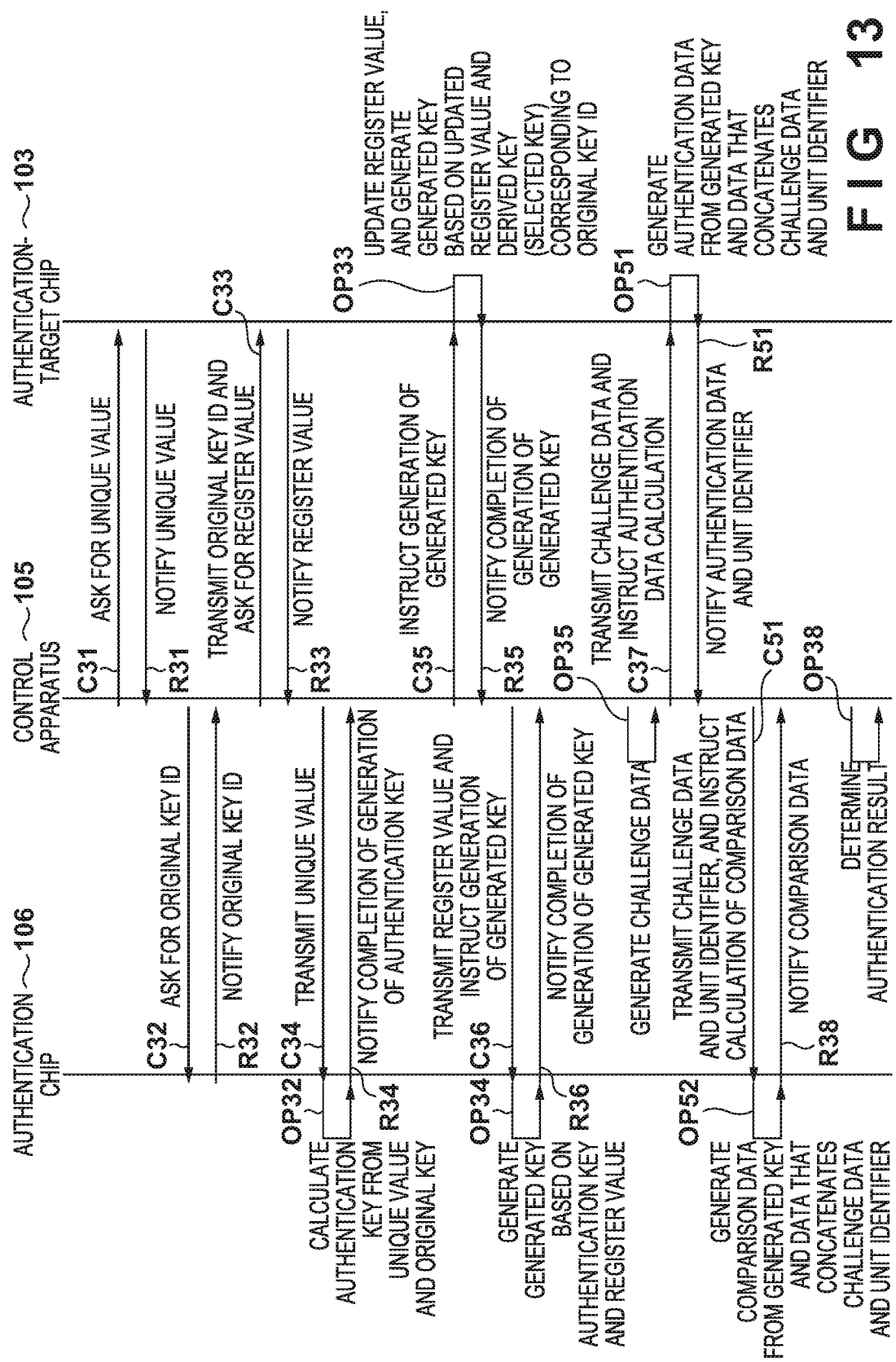
FIG. 13 is a sequence diagram of an authentication method according to an embodiment.

FIG. 13 is a sequence diagram of authentication processing according to the present embodiment. Processing up until C37 is the same as that in the third embodiment, and description thereof is omitted. Upon receiving the challenge data, the authentication-target chip 103, at OP51, uses the encryptor 304 to generate authentication data. In the present embodiment, the encryptor 304 generates the authentication data in accordance with the generated key, and concatenated data resulting from concatenating the challenge data and the unit identifier stored in the non-volatile memory 305. At R51, the authentication-target chip 103 notifies the authentication data and the unit identifier to the control apparatus 105. At C51, the control apparatus 105 transmits to the authentication chip 106 a command for generating comparison data. This command includes the challenge data and the unit identifier. At OP52, the authentication chip 106 uses the encryptor 204 to generate comparison data in accordance with the generated key and concatenated data resulting from concatenating the received challenge data and the unit identifier. At R38, the authentication chip 106 notifies the comparison data (response data) to the control apparatus 105. Subsequent processing is the same as in the third embodiment.

In the present embodiment, the unit identifier is used in generation of the authentication data and the comparison data. Accordingly, in addition to a similar effect as in the third embodiment, it is possible to verify whether the unit identifier is a value used in a genuine product. In other words, although illustration is not made in FIG. 13, it is possible to make a determination of authentication NG when the unit identifier is not used, even if the authentication data and the comparison data match, for example.

Fifth Embodiment

Figure 14:
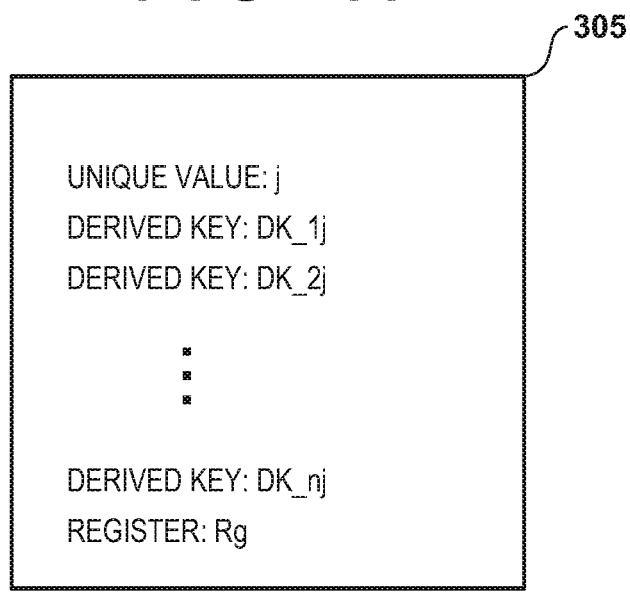
FIG. 14 is a view illustrating information that is stored in the authentication-target chip according to an embodiment.

Subsequently, description is given regarding the fifth embodiment focusing on points of difference with the third embodiment. An authentication system according to the present embodiment has the same configuration as in FIG. 1 and FIG. 2, and the information illustrated in FIG. 4A is stored in the non-volatile memory 205 of the authentication chip 106. However, as illustrated by FIG. 14, one Register Rg is provided in the non-volatile memory 305 of the authentication-target chip 103, instead of the registers $Rg\_1j$ to $Rg\_nj$ of the third embodiment.

FIG. 15 is a sequence diagram of authentication processing according to the present embodiment. The processing from C41 to R42 is the same as that of C31 to R32 of the third embodiment, and description thereof is omitted. At C43, the control apparatus 105 asks the authentication-target chip 103 for a register value. Firstly, at OP41, the authentication-target chip 103 internally generates a random number, and stores the generated random number in the Register Rg. In addition, the authentication-target chip 103 notifies the register value stored in the Register Rg to the control apparatus 105, at R43. Subsequent processing for C44 and R44 is similar to C34 and R34 of the third embodiment.

At C45, the control apparatus 105 transmits the original key ID to the authentication-target chip 103, and issues a command to the authentication-target chip 103, instructing it to generate the generated key. At OP43, firstly the authentication-target chip 103 selects the derived key corresponding to the original key ID as a selected key. Accordingly, when the authentication-target chip 103 is legitimate, the selected key selected by the authentication-target chip 103 is the same as the authentication key DK_ij generated by the authentication chip 106 at OP42. Next, the authentication-target chip 103 generates the generated key based on the selected key and the register value. Note that the method of generating the generated key is similar to that in the third embodiment, excepting that the register value is used unchanged. When the generated key is generated, the authentication-target chip 103, at R45, notifies the control apparatus 105 that generation of the generated key is complete. The processing from C46 to R46 is the same as the processing of C36 to R36 of the third embodiment. Note that, at OP44, the authentication chip 106 generates the generated key by using the notified register value unchanged.

At OP45, the control apparatus 105 generates random number data as challenge data. At C47, the control apparatus 105 transmits to the authentication-target chip 103 a command for generating authentication data. This command includes the random number data (challenge data). At OP46, the authentication-target chip 103 uses the encryptor 304 to generate the authentication data which is response data, from the generated key and the random number data. At R47, the authentication-target chip 103 notifies the authentication data (response data) to the control apparatus 105.

Similarly, at C48, the control apparatus 105 transmits to the authentication chip 106 a command for generating comparison data. This command includes the random number data (challenge data) generated at OP45, and the authentication data. At OP47, the authentication chip 106 uses the encryptor 204 to generate the comparison data from the generated key and the random number data, and compares the comparison data with the received authentication data. Because the encryptor 204 and the encryptor 304 perform the same encryption calculation, authentication data and the comparison data match when the authentication-target chip 103 is legitimate. At R48, the authentication chip 106 notifies a comparison result to the control apparatus 105, in other words, whether the comparison data and the authentication data match.

At OP48, the control apparatus 105 determines authentication OK upon receiving a notification that the comparison data and the authentication data match, and determines authentication NG when there is no match. Note that, in the present embodiment, a comparison between authentication data and the comparison data is performed by the authentication chip 106 similarly to in the first embodiment, but it may be performed by the control apparatus 105, similarly to in the third embodiment. In addition, in the present embodiment, because the generated key is randomly changed each time of authentication, similarly to in the third embodiment, it is possible to use a fixed value for the challenge data instead of a random number. In addition, because the register value is randomly generated for each authentication in the present embodiment, it is possible to have a configuration in which it is updated by performing a predetermined calculation for each authentication, similarly to in the third embodiment. In other words, in the third embodiment, registers corresponding to respective derived keys are provided, but it is also possible to have a configuration in which one common register is provided for all derived keys. Furthermore, in the second embodiment, it is possible to generate authentication data and comparison data by also using a unit identifier UID, similarly to in the second embodiment or the fourth embodiment.

OTHER EMBODIMENTS

Note that, in the embodiments described above, the process cartridge 102 or the fixing unit 802 of an image forming apparatus was authenticated as a replaceable unit, but any replaceable unit (expansion unit) of the image forming apparatus can be authenticated as an authentication-target apparatus. In addition, the present invention can be applied, not only to an image forming apparatus, but also in the case where any apparatus is set as an authentication apparatus, and any unit that can be detached from the main body of this apparatus is set as an authentication-target apparatus.

Embodiments of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198753, filed on Oct. 12, 2017 and No. 2018-140710, filed on Jul. 26, 2018, which are hereby incorporated by reference herein in their entirety.

What is claimed is:

1. A method of authenticating an authentication-target apparatus by an authentication apparatus that holds a first original key out of a plurality of original keys, and an identifier of the first original key,
the authentication-target apparatus holding a first value, and a plurality of derived keys generated by taking each of the plurality of original keys and the first value as inputs to a one-way function,
the method comprising:
the authentication-target apparatus selecting a selected key from the plurality of derived keys based on the identifier of the first original key which was notified from the authentication apparatus;
the authentication-target apparatus generating a first generated key based on a third value and the selected key, the third value resulting from performing a predetermined calculation with respect to a second value;
the authentication-target apparatus generating authentication data based on challenge data which was notified from the authentication apparatus and the first generated key;
the authentication apparatus generating an authentication key by taking the first original key and the first value which was notified from the authentication-target apparatus as inputs to the one-way function;
the authentication apparatus generating a second generated key based on the third value and the authentication key, the third value resulting from performing the predetermined calculation with respect to the second value which was notified from the authentication-target apparatus;
the authentication apparatus generating comparison data based on the challenge data and the second generated key; and
the authentication apparatus authenticating the authentication-target apparatus by comparing the comparison data and the authentication data which was notified from the authentication-target apparatus.

2. The method according to claim 1, wherein the selected key is, from the plurality of derived keys, a derived key that is generated by taking the first original key and the first value as inputs to the one-way function.

3. The method according to claim 1, wherein the challenge data is data randomly generated by the authentication apparatus.

4. The method according to claim 1, wherein
the authentication-target apparatus has one or more registers respectively corresponding to the plurality of derived keys,
the second value is a value of a register corresponding to the derived key selected as the selected key, and
the authentication-target apparatus updates a value of the register corresponding to the derived key selected as the selected key from the second value to the third value when the first generated key is generated.

5. The method according to claim 1, wherein the challenge data is data randomly generated by the authentication apparatus or is predetermined data.

6. The method according to claim 1, wherein the authentication data and the comparison data are generated by the same algorithm.

7. The method according to claim 6, wherein the authentication data is encrypted data or an encrypted hash value resulting from encrypting the challenge data in accordance with the first generated key.

8. The method according to claim 6, wherein
the authentication-target apparatus holds a fourth value, and
the authentication data is, encrypted data or an encrypted hash value resulting from encrypting, in accordance with the first generated key, data resulting from concatenating the challenge data and the fourth value.

9. The method according to claim 1, wherein the one-way function is a cryptographic hash function, or a function used in shared key encryption.

10. An authentication apparatus, comprising:
a holding unit configured to hold a first original key, from out of a plurality of original keys, and an identifier of the first original key;
a notification unit configured to notify the identifier of the first original key and challenge data to an authentication-target apparatus;
a reception unit configured to receive authentication data, a first value, and a second value from the authentication-target apparatus;
a first generating unit configured to generate an authentication key by taking the first original key and the first value as inputs to a one-way function, generate a generated key based on a third value resulting from performing a predetermined calculation with respect to the second value and the authentication key, and generate comparison data based on the challenge data and the generated key and
an authentication unit configured to authenticate the authentication-target apparatus by comparing the authentication data and the comparison data.

11. The authentication apparatus according to claim 10, further comprising a second generating unit configured to randomly generate the challenge data.

12. The authentication apparatus according to claim 10, wherein the second value is updated by the authentication-target apparatus each time of authentication of the authentication-target apparatus by the authentication apparatus.

13. The authentication apparatus according to claim 10, wherein the challenge data is predetermined data.

14. The authentication apparatus according to claim 10, wherein the comparison data is encrypted data or an encrypted hash value resulting from the challenge data, in accordance with the generated key.

15. The authentication apparatus according to claim 14, wherein
the authentication-target apparatus holds a plurality of derived keys generated by taking each of the plurality of original keys and the first value as inputs to the one-way function, and
the authentication data is data generated in accordance with the same algorithm as for the comparison data, based on a key generated from a selected key selected from the plurality of derived keys based on the identifier of the first original key, and the challenge data.

16. The authentication apparatus according to claim 10, wherein
the reception unit is further configured to receive a fourth value from the authentication-target apparatus, and
the comparison data is encrypted data or an encrypted hash value resulting from encrypting, in accordance with the generated key, data resulting from concatenating the challenge data and the fourth value.

17. The authentication apparatus according to claim 16, wherein
the authentication-target apparatus holds a plurality of derived keys generated by taking each of the plurality of original keys and the first value as inputs to the one-way function, and
the authentication data is data generated in accordance with the same algorithm as for the comparison data, based on a key generated from a selected key selected from the plurality of derived keys based on the identifier of the first original key, and the challenge data, and the fourth value.

18. An image forming apparatus, comprising:
a holding unit configured to hold a first original key, from out of a plurality of original keys, and an identifier of the first original key;
a notification unit configured to notify the identifier of the first original key and challenge data to an authentication-target apparatus;
a reception unit configured to receive authentication data, a first value, and a second value from the authentication-target apparatus
a first generating unit configured to generate an authentication key by taking the first original key and the first value as inputs to a one-way function, generate a generated key based on a third value resulting from performing a predetermined calculation with respect to the second value and the authentication key, and generate comparison data based on the challenge data and the generated key and
an authentication unit configured to authenticate the authentication-target apparatus by comparing the authentication data and the comparison data.

19. The image forming apparatus according to claim 18, wherein the authentication-target apparatus is a unit that can be detached from the image forming apparatus.

20. An authentication-target apparatus, comprising:
a holding unit configured to hold a first value and a plurality of derived keys generated by taking the first value and each of a plurality of original keys as inputs to a one-way function;
a selection unit configured to select a selected key from the plurality of derived keys, based on an identifier, which was notified from an authentication apparatus, of a first original key out of the plurality of original keys;
a first generating unit configured to generate a generated key based on a third value resulting from performing a predetermined calculation with respect to the second value and the authentication key, and to generate authentication data based on challenge data which was notified from the authentication apparatus, and the generated key; and
a notification unit configured to notify the authentication data, the first value, and the second value to the authentication apparatus.

21. The authentication-target apparatus according to claim 20, further comprising one or more registers respectively corresponding to the plurality of derived keys,
wherein the second value is a value stored in a register corresponding to a derived key selected as the selected key, and
the first generating unit is further configured to update the value of the register corresponding to the derived key selected as the selected key from the second value to the third value.

22. The authentication-target apparatus according to claim 20, wherein the challenge data is data randomly generated by the authentication apparatus or is predetermined data.

23. The authentication-target apparatus according to claim 20, wherein the authentication data is encrypted data or an encrypted hash value resulting from the challenge data, in accordance with the generated key.

24. The authentication-target apparatus according to claim 20, wherein the holding unit holds a fourth value,
the notification unit is further configured to notify the fourth value to the authentication apparatus, and
the authentication data is encrypted data or an encrypted hash value resulting from encrypting, in accordance with the generated key, data resulting from concatenating the challenge data and the fourth value.

25. The authentication-target apparatus according to claim 20, wherein the authentication-target apparatus is a unit that can be detached from an image forming apparatus.

26. The authentication-target apparatus according to claim 24, wherein
the authentication-target apparatus is a unit that can be detached from an image forming apparatus, and
the fourth value is an identifier of the unit.

27. The authentication-target apparatus according to claim 20, wherein the one-way function is a cryptographic hash function, or a function used in shared key encryption.

* * * * *